United States Patent
Kato

Patent Number: 5,876,316
Date of Patent: Mar. 2, 1999

[54] AUTOMATIC TOOL CHANGER

[75] Inventor: Heizaburo Kato, Shizuoka, Japan

[73] Assignee: Sankyo Manufacturing Co., Ltd., Tokyo, Japan

[21] Appl. No.: 965,165

[22] Filed: Nov. 6, 1997

[30] Foreign Application Priority Data

Nov. 11, 1996 [JP] Japan .................................. 8-298953

[51] Int. Cl.$^6$ .................................................. B23Q 3/157
[52] U.S. Cl. .................................................. 483/44; 483/39
[58] Field of Search .............................. 483/44, 38, 39, 483/40, 41, 42, 43, 45, 46; 414/591, 738; 294/106; 74/84 R

[56] References Cited

U.S. PATENT DOCUMENTS

| | | | |
|---|---|---|---|
| 4,036,374 | 7/1977 | Woltjen | 414/591 |
| 4,384,397 | 5/1983 | Nelson | 483/41 |
| 4,833,772 | 5/1989 | Kobayashi et al. | 483/44 |
| 4,884,332 | 12/1989 | Ozawa et al. | 483/44 |
| 5,081,762 | 1/1992 | Kin | 483/44 |

FOREIGN PATENT DOCUMENTS

| | | | |
|---|---|---|---|
| 60-31545 | 3/1985 | Japan . | |
| 61-76244 | 4/1986 | Japan | 483/41 |
| 61-187641 | 11/1986 | Japan . | |
| 61-270047 | 11/1986 | Japan | 483/39 |
| 62-120935 | 5/1987 | Japan | 483/39 |
| 222837 | 9/1989 | Japan | 483/41 |
| 1144844 | 3/1985 | U.S.S.R. | 483/39 |

*Primary Examiner*—William Briggs
*Attorney, Agent, or Firm*—Morrison & Foerster LLP

[57] ABSTRACT

An automatic tool changer can reduce a space required for an output shaft and thus permits downsizing of the whole device. Also, the automatic tool changer can reduce an inertia force in reciprocal linear motion to perform high speed operation. The automatic tool changer has a motion converting cam which converts a rotational motion of a lifting rotary shaft into a linear motion. A cam follower of an arm supporting member is engaged with the motion converting cam. When relative rotational swing motion is caused between the lifting rotary shaft and a pivoting rotary shaft, the cam follower causes reciprocal linear motion relative to the motion converting cam. Then, the arm supporting member which is movable in an axial direction relative to the pivoting rotary shaft through a spline coupling, causes reciprocal linear motion on a tool holding arm. Upon synchronous rotation of the lifting rotary shaft and the pivoting rotary shaft, relative displacement between the motion converting cam and the cam follower is not caused so that the arm supporting member and the tool holding arm are pivoted with the pivoting rotary shaft.

17 Claims, 10 Drawing Sheets

rotation angle of rotary shaft for lifting

Fig. 6 (B)

rotation angle of rotary shaft for lifting

AUTOMATIC TOOL CHANGER

BACKGROUND OF THE INVENTION

1. Field of the Invention

The present invention relates to an automatic tool changer for automatically changing tools to be supported on an arm, by pivotally or reciprocally operating the arm.

2. Description of the Related Art

As automatic tool changer, there has been known those disclosed in Japanese Unexamined Utility Model Publication (Kokai) No. Showa 60-31545 and Japanese Unexamined Utility Model Publication No. Showa 61-187641. The automatic tool changer, disclosed in the above-identified publications, has drum-shaped cam for converting rotational input into a swing motion to transmit the swing motion thus converted by the drum-shaped cam to an output shaft for driving the output shaft to rotate at a predetermined timing.

On the other hand, a cam groove is formed on one side surface of the drum-shaped cam for causing a swing motion of a link by the cam groove. The swing motion of the link is then transmitted to the output shaft to cause reciprocal motion of the output shaft in axial direction at a predetermined timing. By rotation of the output shaft, a tool holding arm fixed on the output shaft is pivoted to select the tools. Then, chucking and releasing of the tool is automatically performed by axial motion of the output shaft.

However, in such conventional automatic tool changer, the output shaft is not only rotated but also moved in axial direction. Accordingly, it becomes necessary to certainly provide a space for axial motion of the output shaft within a housing to inherently cause increasing of size of the housing and thus to be a hazard for down-sizing of the automatic tool exchanger.

On the other hand, in the foregoing conventional automatic tool changer, the axial reciprocating motion of the output shaft for chucking and releasing the tool can be obtained by swing motion of the link. The link has a construction to take one end portion as a pivot, the other end portion as a working point and an intermediate portion as a power point engaging with the cam groove. With such link construction, a significant load is created upon transmitting the force. Also, since the output shaft and the tool holding arm are integrally moved in axial direction to create a large inertia force, significant difficulty should be caused in realizing high speed motion of the automatic tool changer.

SUMMARY OF THE INVENTION

It is an object of the present invention to provide an automatic tool changer which can achieve down-sizing by reducing a space required for an output shaft with a construction, in which only a tool holding arm performs reciprocal linear motion in an axial direction instead of causing reciprocal linear motion of the output shaft, and can permit high speed operation by reducing an inertia force to be exerted upon reciprocal linear motion for the tool holding arm.

In order to accomplish the above-mentioned and other objects, according to one aspect of the invention, an automatic tool changer comprises:

a first rotary shaft, to which rotational motion is input at a first timing;

a second rotary shaft provided coaxially with the first rotary shaft and permitting mutual relative rotation, and, to which rotational motion is input at a second timing;

a motion converting cam provided on the first rotary shaft and converting a rotational motion about an axis of said first rotary shaft into a linear motion in an axial direction;

an arm supporting member having a cam follower engaged with the motion converting cam and being splined with the second rotary shaft for relative motion in a direction of axis of the second rotary shaft; and a tool holding arm provided on the arm supporting member and detachably supporting a tool.

The first rotary shaft may be arranged at the center and the second rotary shaft in cylindrical form being coaxially arranged outside of the first rotary shaft for permitting relative rotation.

The motion converting cam may be constructed with a cam groove formed into a spiral shape on the periphery of the first rotary shaft.

It is preferred that the cam groove of the motion converting cam formed in spiral shape is set in a meandering pattern to set shifting speed of the cam follower low at initial stage of shifting, high at subsequent motion range and low upon stopping. In the alternative, the cam groove of the motion converting cam formed in spiral shape is set in a linear pattern to set shifting speed of said cam follower constant.

The first rotational motion to be input to the first rotary shaft at the first timing may be a forward and reverse rotational swing motion, and the second rotational motion to be input to the second rotary shaft at the second timing is an intermittent rotation.

Preferably, the first rotational motion to be input to the first rotary shaft at the first timing is a forward and reverse rotational swing motion, the second rotational motion to be input to the second rotary shaft at the second timing is an intermittent rotation, linear motion and rotational motion relative to the arm supporting member provided on the second rotary shaft are created independently of each other by setting the rotational motion at the first timing and the rotational motion at the second timing, upon stopping of the second rotary shaft, the first rotary shaft is caused rotational swing motion in forward and reverse directions, and, upon intermittent rotation in one direction of the second rotary shaft, the first rotary shaft is rotated synchronously in the same direction.

The rotational motion input to the first rotary shaft at the first timing may be created by a first converting mechanism having a first cam provided on the input shaft and a first turret provided with a cam follower engaged with the first cam.

Also, the rotational motion input to the second rotary shaft at the second timing maybe created by a second converting mechanism having a second cam provided on the input shaft and a second turret provided with a cam follower engaged with the second cam.

The first cam and the second cam may be globoidal cams provided for integral rotation with the same input shaft.

At least one of a set of the first turret of the first converting mechanism and said first rotary shaft and a set of the second turret of the second converting mechanism and the second rotary shaft may be mutually connected via a speed increasing gear mechanism transmitting the rotation speed of one of said first turret and said second turret to one of the first rotary shaft and the second rotary shaft with acceleration.

The rotational motion of the first timing may be created by controlling revolution of a first servomotor connected to the first rotary shaft.

Also, the rotational motion of the second timing may be created by controlling revolution of a second servomotor connected to the second rotary shaft.

In the preferred construction, the first servo motor and the second servo motor are arranged coaxially in vertically stacked fashion, one of the first servo motor and the second servo motor positioned at upper position is formed into a cylindrical shape having a hollow portion formed at the central portion, through which the second rotary shaft or the first rotary shaft is inserted, and an output portion surrounding the hollow portion, the output portion being connected to the first rotary shaft or the second rotary shaft, and the other of the first servo motor and the second servo motor arranged at the lower position is connected to the second rotary shaft or the first rotary shaft downwardly extended through the hollow portion.

At least one of the first servo motor and the second servo motor may be arranged at a position distanced from the first rotary shaft or the second rotary shaft, and at least one of the first servo motor and the second servo motor may be connected to any one of the first rotary shaft and the second rotary shaft via at least one of gear mechanisms.

According to another aspect of the invention, an automatic tool changer comprises:

a first converting mechanism creating rotational motion at a first timing and including a first globoidal cam provided on an input shaft and a first turret provided with a cam follower engaged with the first globoidal cam;

a second converting mechanism creating rotational motion at a second timing and including a second globoidal cam provided on the input shaft for integral rotation with the first globoidal cam, and a second turret having a cam follower engaged with the second globoidal cam;

a first rotary shaft connected to the first converting mechanism and being input rotational motion at the first timing from said first converting mechanism;

a second rotary shaft formed into a cylindrical shape, arranged outside of the first rotary shaft in coaxial fashion for permitting relative angular displacement, connected to the second converting mechanism and being input rotational motion at the second timing from said second converting mechanism;

a motion converting cam provided on the first rotary shaft and having a spiral cam groove converting the rotational motion about the first rotary shaft into a linear motion in the axial direction;

an arm supporting member having a cam follower engaged with the motion converting cam and being splined with the second rotary shaft for relative axial motion; and a tool holding arm provided on the arm supporting member and detachably supporting a tool, a rotational motion to be input to the first rotary shaft at the first timing being a rotational swing motion in forward and reverse direction, a rotational motion to be input to the second rotary shaft at the second timing being an intermittent rotation, the rotational motion at the first timing and the rotational motion at the second timing being set in order to cause linear motion and rotational motion independently for the arm supporting member provided on the second rotary shaft in such a manner that the first rotary shaft is driven for rotational swing motion in forward and reverse direction upon stopping of the second rotary shaft, and upon intermittent rotation of the second rotary shaft, the first rotary shaft is rotated synchronously in the same direction.

According to a further aspect of the invention, an automatic tool changer comprises:

a first servomotor controlled revolution for creating a rotational motion at a first timing;

a second servomotor controlled revolution for creating a rotational motion at a second timing;

a first rotary shaft connected to the first servomotor and being input the rotational motion at the first timing;

a second rotary shaft formed into a cylindrical shape, arranged outside of the first rotary shaft for permitting relative rotation therebetween, and connected to the second servo motor to be input the rotational motion at the second timing;

a motion converting cam provided on the first rotary shaft and formed with a spiral cam groove for converting a rotational motion about the first rotary shaft into a linear motion in an axial direction thereof;

an arm supporting member having a cam follower engaged with the motion converting cam and splined with the second rotary shaft for relative displacement in the axial direction; and a tool holding arm provided on the arm support member and detachably supporting a tool, a rotational motion to be input to the first rotary shaft at the first timing being a rotational swing motion in forward and reverse direction, a rotational motion to be input to the second rotary shaft at the second timing being an intermittent rotation, the rotational motion at the first timing and the rotational motion at the second timing being set in order to cause linear motion and rotational motion independently for the arm supporting member provided on the second rotary shaft in such a manner that the first rotary shaft is driven for rotational swing motion in forward and reverse direction upon stopping of the second rotary shaft, and upon intermittent rotation of the second rotary shaft, the first rotary shaft is rotated synchronously in the same direction.

The operation of the automatic tool changer according to the present invention, constructed as set forth above, will be discussed, the first rotary shaft is rotated by the rotational motion input thereto at the first timing and the second rotary shaft is rotated by rotational motion input thereto at the second timing. The motion converting cam is rotated about the axis by the first rotary shaft and the arm supporting member is rotated about the axis by the second rotary shaft splined thereto. At this time, since the cam follower of the arm supporting member is engaged with the motion converting cam converting the rotational motion about axis of the first rotary shaft into the linear motion in the axial direction, once relative rotation is caused between the first rotary shaft and the second rotary shaft according to setting of the rotational motion at the first and second timings, the cam follower may be displaced with respect to the motion converting cam to perform linear motion. By this, the arm supporting member provided for relative motion relative to the second rotary shaft in the axial direction causes linear motion of the tool holding arm.

On the other hand, upon rotating the first rotary shaft and the second rotary shaft in synchronism with each other, relative displacement is not caused between the motion converting cam and the cam follower. Thus, the arm supporting member is simply rotated by the second rotary shaft to simply pivot the tool holding arm.

As set forth above, the combining the first rotary shaft and the second rotary shaft serves as the output shaft for causing linear motion in the axial direction and pivoting motion. In the present invention, since the motion converting cam for converting the rotational motion of the first rotary shaft about the axis thereof into a linear motion in the axial direction, and the arm supporting member having the cam follower engaging with the motion converting cam and splined with the second rotary shaft for relative motion in the axial direction, it becomes possible to cause linear motion only in the tool holding arm without causing any linear motion in the axial direction in both of the first and second rotary shafts, particularly in the first rotary shaft which causes linear motion of the tool holding arm in the axial direction. Therefore, a space required for the first rotary shaft and the second rotary shaft as the output shafts can be only space necessary for rotational motion, and this can be minimum. This contributes for downsizing of the whole arrangement.

On the other hand, since all of the motion system except for the motion converting cam for causing lifting motion of the tool holding arm and the splined portion of the arm supporting member having the cam follower engaging with the motion converting cam, are constructed with rotary motion system, and constructional portion for obtaining the lifting motion is formed only by the cam mechanism. Therefore, motion is smooth and load to be created is small. Also, since the elements for causing the lifting motion are only the arm supporting member and the tool holding arm, the inertia force to be created can be reduced to realize high speed operation of the automatic tool changer.

On the other hand, the rotational motion input to the first rotary shaft at the first timing is creased by the first converting mechanism consisted of the first cam provided on the input shaft and the first turret provided with the cam follower engaged with the first cam. When the first cam is rotated by the input shaft, the cam follower is shifted along the first cam, and then the first turret having the cam follower is rotated about the axis thereof. The rotation of the first turret is transmitted to the first rotary shaft. This rotational motion at the first timing is set by the cam configuration of the first cam.

Furthermore, rotational motion input to the second rotary shaft at the second timing is created by the second converting mechanism having the second cam provided on the input shaft and the second turret provided with the cam follower engaging with the second cam. When the input shaft rotates the second cam, the cam follower is shifted along the second cam, and then the second turret having the cam follower is rotated about the axis thereof. The rotation of the second turret is transmitted to the second rotary shaft. This rotational motion at the second timing is set by the cam configuration of the second cam.

Also, employing the second converting mechanism together with the first converting mechanism, the first rotary shaft and the second rotary shaft are driven to rotate by taking out the rotational motion from the same input shaft at the first and second timings, accuracy of actuation of the tool holding arm obtained by interaction between the motion converting cam and the arm supporting member provided on respective rotary shafts, can be enhanced to realize high speed operation.

On the other hand, the rotational motion at the first timing and the rotational motion at the second timing can be caused by controlling revolution of the first servomotor and the second servomotor respectively connected to the first rotary shaft and the second rotary shaft. Therefore, the construction of the automatic tool changer can be simplified and made compact to contribute for downsizing of the automatic tool changer.

BRIEF DESCRIPTION OF THE DRAWINGS

The present invention will be understood more fully from the detailed description given herebelow and from the accompanying drawings of the preferred embodiment of the present invention, which, however, should not be taken to be limitative to the invention, but are for explanation and understanding only.

In the drawings.

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid unnecessary obscure the present invention.

Figure 1:
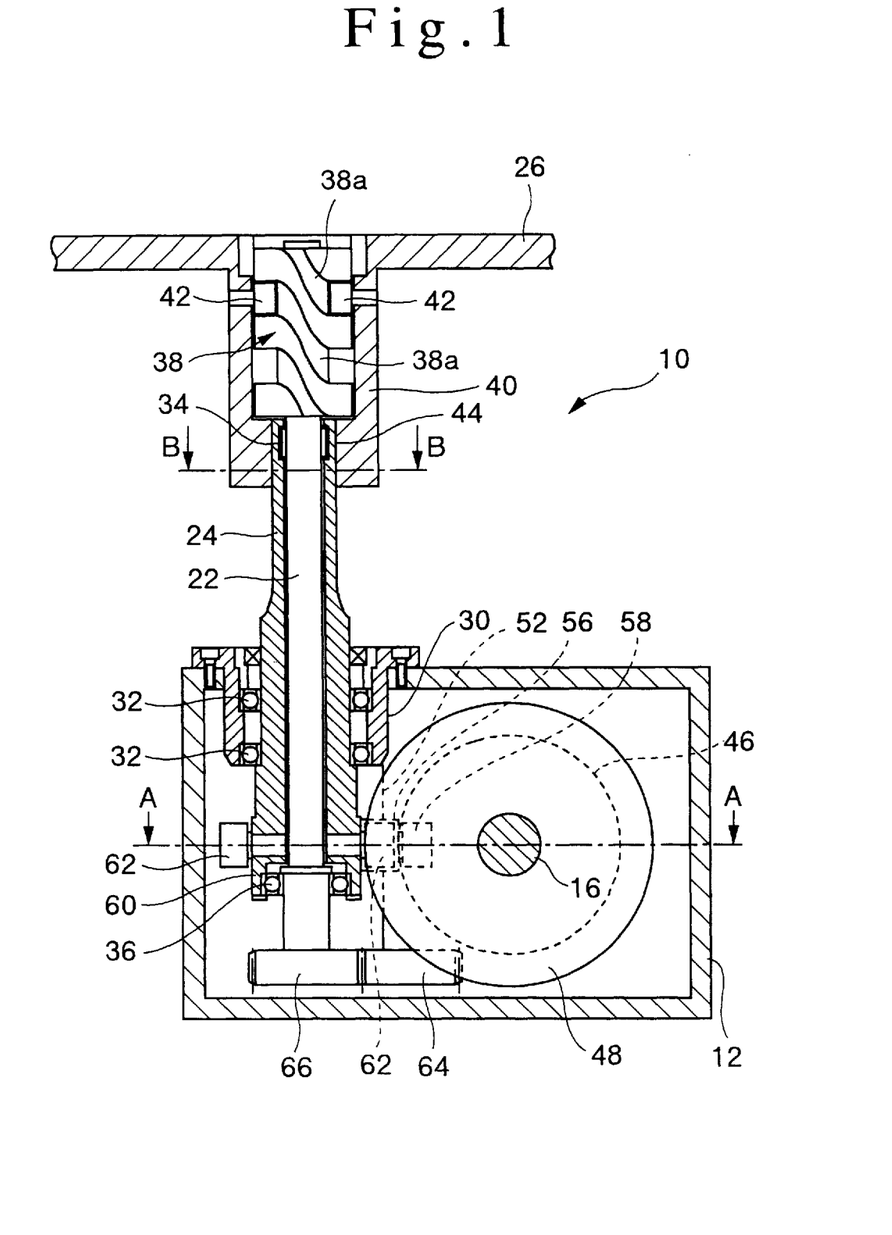
FIG. 1 is a sectional front elevation of the first embodiment of an automatic tool changer according to the present invention.
Figure 2:
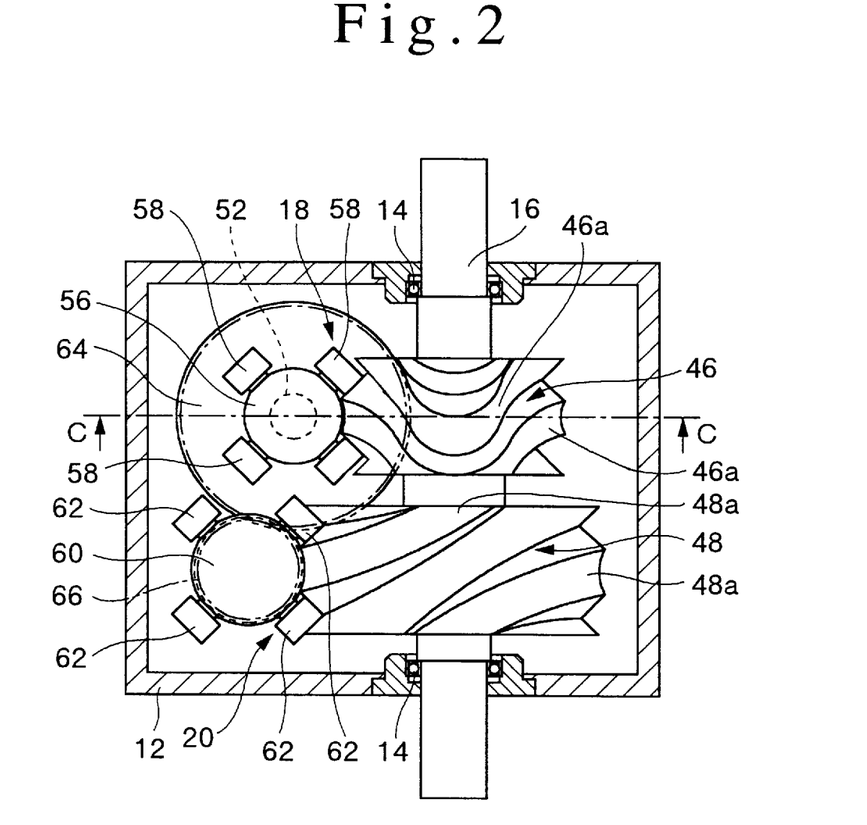
FIG. 2 is a section taken along line A—A of FIG. 1.
Figure 3:
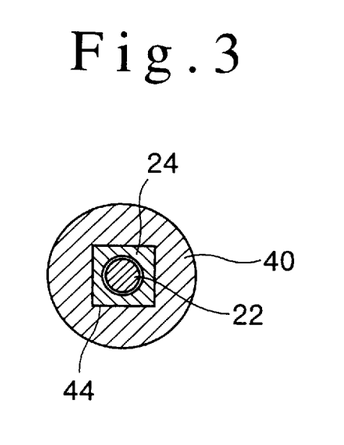
FIG. 3 is a section taken along line B—B of FIG. 1.

The first embodiment of an automatic tool changer according to the present invention includes a rotary shaft 22 for lifting as a first rotary shaft, to which a rotational motion is input at a first timing, a rotary shaft 24 for pivoting provided coaxially with the lifting rotary shaft 22 and for relative angular displacement with the latter, to which a rotational motion is input at a second timing, a motion converting cam 38 provided on the lifting rotary shaft 22 and converting a rotational motion about a rotational axis of the lifting rotary shaft 22 into a linear motion in an axial direction of the lifting rotary shaft 22, an arm supporting member 40 having a cam follower 42 engaged with the motion converting cam 38 and provided on the pivoting rotary shaft 24 with spline engagement 44 for permitting relative motion in the axial direction of the pivoting rotary shaft 24, and a tool holding arm 26 provided on the arm supporting member 40 and detachably supporting a tool 72. The rotary motion at the first timing to be input to the lifting rotary shaft 22 is created by a first converting mechanism 18 having a cam 46 for lifting as a first cam provided on an input shaft 16 and a turret 56 for lifting as a first turret provided with a cam follower 58 engaging with the lifting cam 46. On the other hand, the rotational motion at the second timing input to the pivoting rotary shaft 24 is created by a second converting mechanism 20 having a cam 48 for pivoting as a second cam provided on the input shaft 16 and a turret 60 for pivoting as a second turret provided with a cam follower 62 engaging with the pivoting cam 48.

The lifting rotary shaft 22 is rotated by rotational motion input thereto at the first timing. Also, the pivoting rotary shaft 24 is rotated by rotational motion input thereto at the second timing. Associating with these motions, the motion converting cam 38 is rotated by the lifting rotary shaft 22 about the rotational axis thereof. Also, the arm supporting member 40 is rotated by the pivoting rotary shaft 24, to which the arm supporting member 40 is splined, about the rotational axis thereof. At this time, since the motion converting cam 38 converting the rotational motion about the rotational axis of the lifting rotary shaft 22 into the linear motion in the axial direction thereof, engages with a cam follower 42 of the arm supporting member 40, according to setting of both of rotational motions at the first and second timings, relative rotational swing motion is caused between the lifting rotary shaft 22 and the pivoting rotary shaft 24, reciprocal linear motion is caused by displacement of the cam follower 42 relative to the motion converting cam 38. By this, the arm supporting member 40 provided on the pivoting rotary shaft 24 for relative displacement along the axial direction via the spline coupling 44 causes reciprocal linear motion of the tool holding arm 26.

On the other hand, upon synchronously rotating the lifting rotary shaft 22 and the pivoting rotary shaft 24, relative displacement is not caused between the motion converting cam 38 and the cam follower 42, the arm supporting member 40 is only rotated by the pivoting rotary shaft 24, and the tool holding arm 26 causes simple pivoting motion.

Discussing hereinafter in greater detail, in the shown embodiment of the automatic tool changer illustrated in FIGS. 1 to 9, the rotation of the input shaft 16 rotatably mounted on a housing 12 via ball bearings 14 is transmitted with converting into rotational swing motion and an intermittent rotation of predetermined timings, to the lifting rotary shaft 22 and to the pivoting rotary shaft 24 through the first converting mechanism 18 and the second converting mechanism 20, and causes pivotal motion and axial motion in the tool holding arm 26 by the rotational swing motion and intermittent rotation.

The lifting rotary shaft 22 and the pivoting rotary shaft 24 are constructed so that the lifting rotary shaft 22 is arranged at the center portion and the pivoting rotary shaft 24 is arranged coaxially with the lifting rotary shaft 22 on the outer side thereof for relative angular displacement. Then, these lifting rotary shaft 22 and the pivoting rotary shaft 24 are arranged vertically so that those shafts 22 and 24 are oriented in the perpendicular direction with respect to the orientation of the input shaft 16. The outer pivoting rotary shaft 24 is rotatably supported via the ball bearings 32 on an outer cylinder 30 which is extended through the housing 12 and fixed at the upper side thereof. The inner lifting rotary shaft 22 is supported for relative rotation with respect to the pivoting rotary shaft 24 via a needle bearing 34 arranged at the upper end portion and a ball bearing 36 arranged at the lower end portion.

On the upper end portion of the lifting rotary shaft 22, the motion converting cam 38 for converting the rotational motion into the axial motion is provided in the axial direction of the lifting rotary shaft 22. The motion converting cam 38 has a cam groove 38a formed into a predetermined spiral shape as shown in FIGS. 6(A) or 6(B) on the outer periphery of the lifting rotary shaft 22. The cam followers 42 engaging with the cam groove 38a is designed to cause reciprocal linear motion in the axial direction by relative rotational swing motion of the lifting rotary shaft 22 relative to the pivoting rotary shaft 24 on which the arm supporting member 40 is provided.

When a meandering cam pattern as shown in FIG. 6(A) is set, the cam followers 42, and thus the tool holding arm 26 can be driven for moderately shifting in the initial stage of motion, for swift shifting in the intermediate range of shifting, and for again moderately shifting in the terminating end of the motion. On the other hand, FIG. 6(B) shows the case where linear cam pattern is set for driving the tool holding arm 26 to shift at equal speed. As can be appreciated herefrom, by appropriately selecting the cam pattern, shifting speed of the tool holding arm 26 can be controlled. Therefore, it becomes possible to set various motion pattern of the tool holding arm 26 adapting to various specifications of the tool holding arms 26. In general, the equal speed motion not to use a cam should be significantly influenced by inertia force upon starting up and stopping to cause vibration of the tool holding arm, whereas the cam pattern is employed, influence of the inertia force can be suppressed to be small to permit high speed and smooth operation.

On the outside of the motion converting cam 38 constructed as set forth above, the cylindrical arm supporting member 40 is provided for relative displacement and relative rotation. On the upper end portion of the arm supporting member 40, the tool holding arm 26 is integrally formed. On the other hand, on the arm supporting member 40, a pair of cam followers 42 is mounted at inwardly opposing positions. The cam followers 42 are engaged with the cam groove 38a of the motion converting cam 38.

The lower end of the arm supporting member 40 is splined with the outer side of the upper end portion of the pivoting rotary shaft 24. The spline coupling 44 is established by forming the outer periphery of the upper end portion of the pivoting rotary shaft 24 into a quadrangular shaped section and by forming an engaging groove of the arm supporting member 40 in the complementary shape with the outer periphery of the pivoting rotary shaft 24 for establishing mutual engagement therebetween. Accordingly, via the splined portion 44, the arm supporting member 40 is rotated integrally with the pivoting rotary shaft 24, and in turn, movable in the axial direction relative to the pivoting rotary shaft 24. The spline coupling 44 is merely required to permit relative motion between the arm supporting member 40 and the pivoting rotary shaft 24 and to restrict relative rotational motion about the shaft 24. Therefore, any other mechanism which can realize the required function may be employed.

On the input shaft 16, the lifting cam 46 and the pivoting cam 48 which are respectively formed as globoidal cams, are provided for integral rotation. On the outer peripheries of the lifting cam 46 and the pivoting cam 48, tapered ribs 46a and 48a are formed with respectively predetermined shapes.

Figure 4:
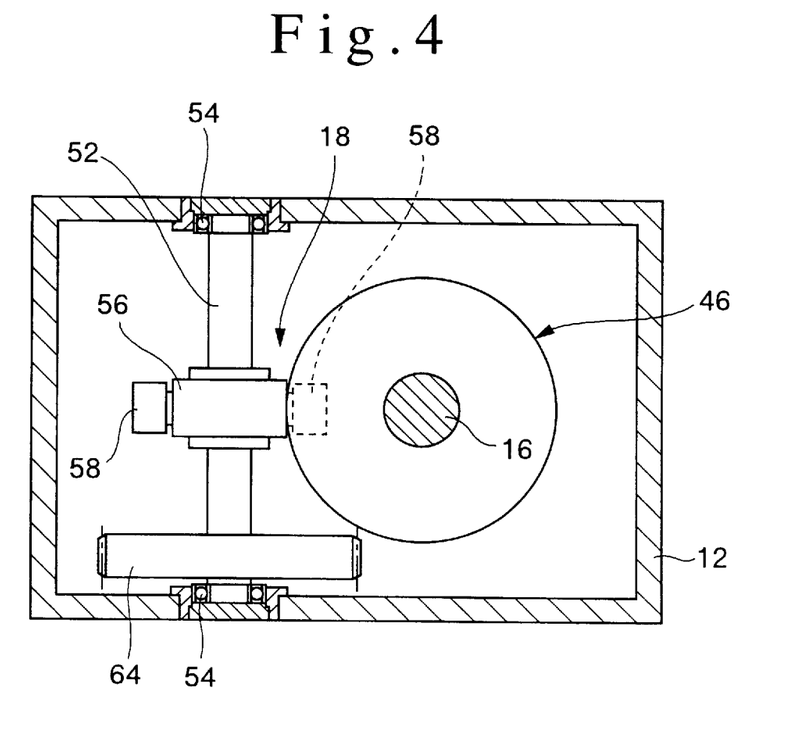
FIG. 4 is a section taken along line C—C of FIG. 2.

On one side of the lifting cam 46, a support shaft 52 is extended vertically so that it may be oriented perpendicularly to the input shaft 16, as shown in FIG. 4. The support shaft 52 is rotatably supported on the housing 12 via ball bearings 54. On the support shaft 52, a lifting turret 56 is provided. On the outer periphery of the lifting turret 56, cam followers 58 engaging with the lifting cam 46 with clamping both sides of a tapered rib 46a of the latter, are provided. In the shown embodiment, four cam followers 58 are arranged on the outer periphery of the lifting turret 56 with a regular angular interval. Amongst, adjacent two of the cam followers 58 are engaged on both sides of the tapered rib 46a. By the lifting cam 46 and the lifting turret 56 provided with the cam followers 58, the first converting mechanism 18 is constructed.

On the other hand, the lower end of the pivoting rotary shaft 24 is formed as a pivoting turret 60. On the outer periphery of the pivoting turret 60, cam followers 62 engaging with a tapered rib 48a of the pivoting cam 48, are provided. Similarly to the cam followers 58 of the lifting turret 56, four cam followers 62 are arranged on the outer periphery of the pivoting turret 60 with a regular angular interval. Amongst, adjacent two of those four cam followers 62 engage with both sides of the tapered rib 48a of the pivoting cam 48. By the pivoting cam 48 and the pivoting turret 60 provided with the cam followers 62, the second converting mechanism 20 is constructed.

On the lower end portion of the support shaft 52 supporting the lifting turret 56, a first gear 64 is provided. On the other hand, on the lower end portion of the lifting rotary shaft 22, a second gear 66 projecting from the lower end of the pivoting turret 60 and meshing with the first gear 64 at the projecting portion, is provided. Through these first and second gears 64 and 66, the rotation of the lifting turret 56 is transmitted to the lifting rotary shaft 22. In the shown embodiment, a gear ratio of the first gear 64 and the second gear 66 is set at 2:1 so that the rotation of the lifting turret 56 is transmitted to the lifting rotary shaft 22 with acceleration.

Figure 5:
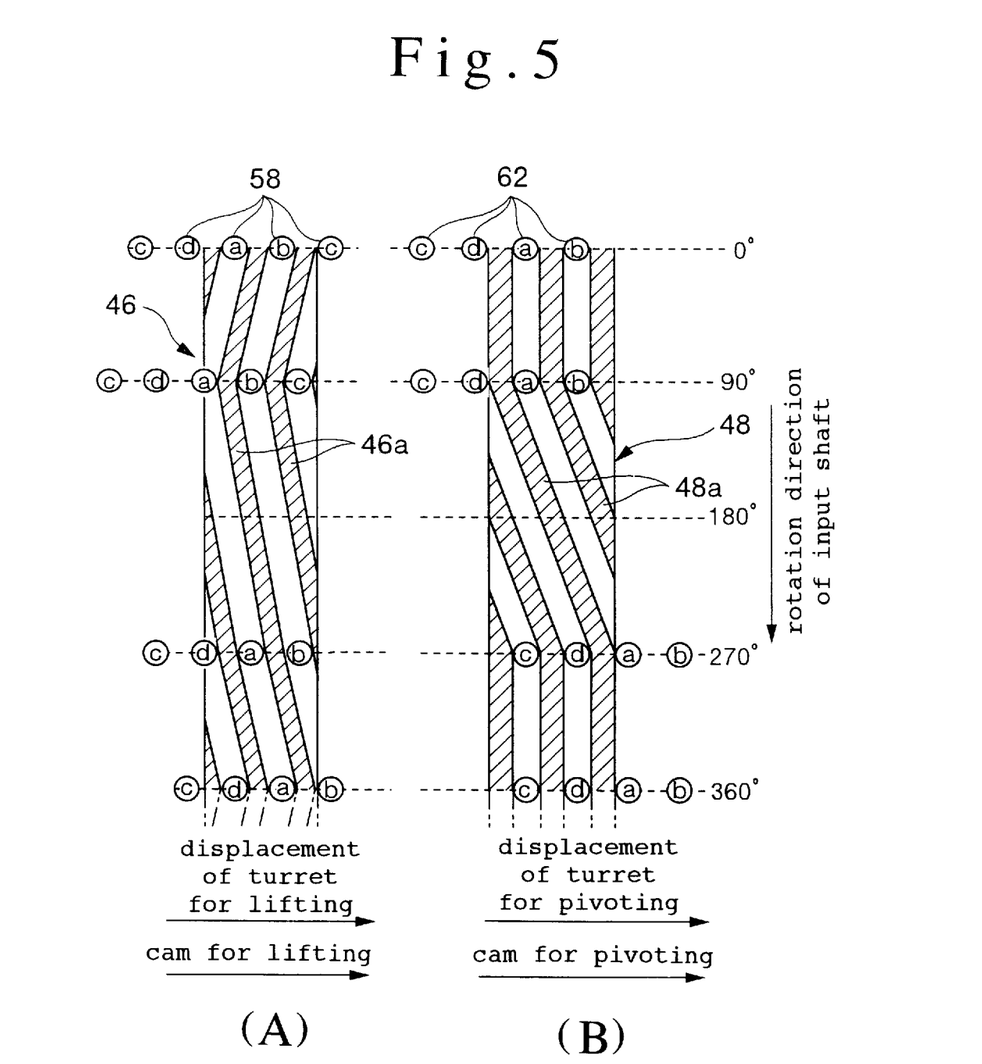
FIG. 5 is an explanatory illustration showing cam configuration of a lifting cam and a pivoting cam in developed condition.
Figure 6:
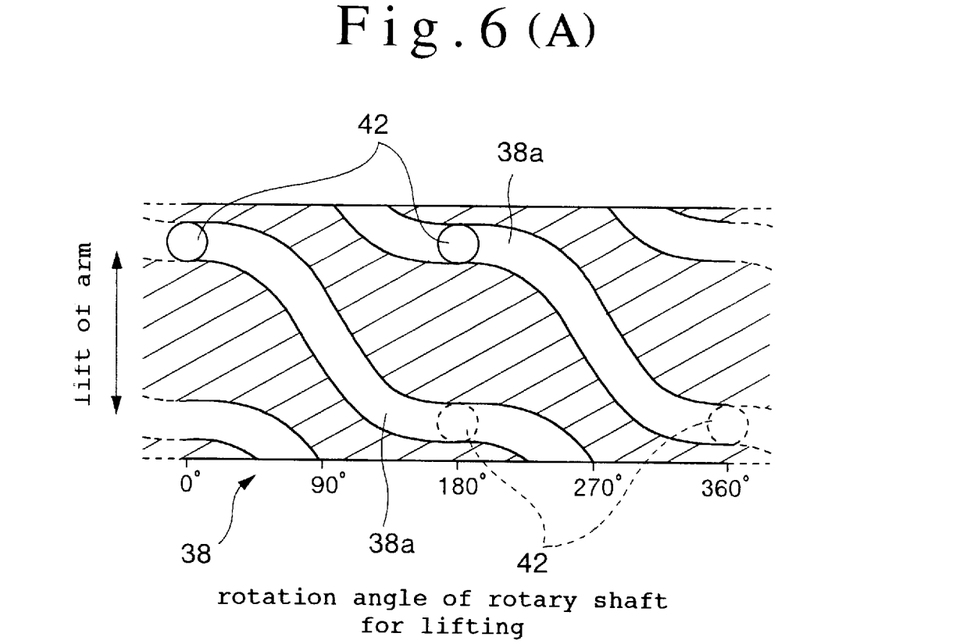
FIGS. 6a and 6b are explanatory illustrations showing a cam configuration of a motion converting cam in developed condition.

Here, the tapered rib 46 of the lifting cam 46 forming the first converting mechanism 18 is formed into a meandering shaped cam pattern as shown in FIG. 5(A) to cause displacement of the lifting turret 56 so that rotational swing motion at the first timing is transmitted to the lifting rotary shaft 22 via the first gear 64 and the second gear 66. Also, the tapered rib 48a of the pivoting cam 48 forming the second converting mechanism 20 has a spiral shaped cam pattern as shown in FIG. 5(B) for transmitting intermittent rotation at the second timing to the pivoting rotary shaft 24 with causing displacement of the pivoting turret 60.

In the shown embodiment of the cam type automatic tool changer constructed as set forth above, when the input shaft 16 is driven to rotate, the lifting cam 46 and the pivoting cam 48 are rotated therewith. Then, by rotation of the lifting cam 46, the cam followers 58 are shifted in the axial direction of the input shaft 16 along the tapered rib 46a. Thus, the lifting turret 56 is driven to cause rotational swing motion about the support shaft 52 at the first timing. This rotational swing motion is transmitted to the lifting rotary shaft 22 via the first and second gears 64 and 66. On the other hand, by rotation of the pivoting cam 48, the cam followers 62 are also shifted in the axial direction of the input shaft 16 along the tapered rib 48a so that the pivoting turret 60 may cause intermittent rotation of the pivoting rotary shaft 24 at the second timing.

The rotational swing motion of the lifting rotary shaft 22 is transmitted to the motion converting cam 38 provided at the upper end portion of the lifting rotary shaft 22. The rotational swing motion of the motion converting cam 38 is converted into reciprocal linear motion of the arm supporting member 40 via the cam followers 42 engaged with the cam groove 38a, thus into lifting motion in the vertical direction for lifting the tool holding arm 26 up and down. Upon lifting motion, the arm supporting member 40 causes sliding motion via the splined portion 44. On the other hand, the intermittent rotation of the pivoting rotary shaft 24 is also transmitted to the arm supporting member 40 via the splined portion 44. Thus, the tool holding arm 26 causes intermittent pivoting motion together with the arm supporting member 40.

Figure 9:
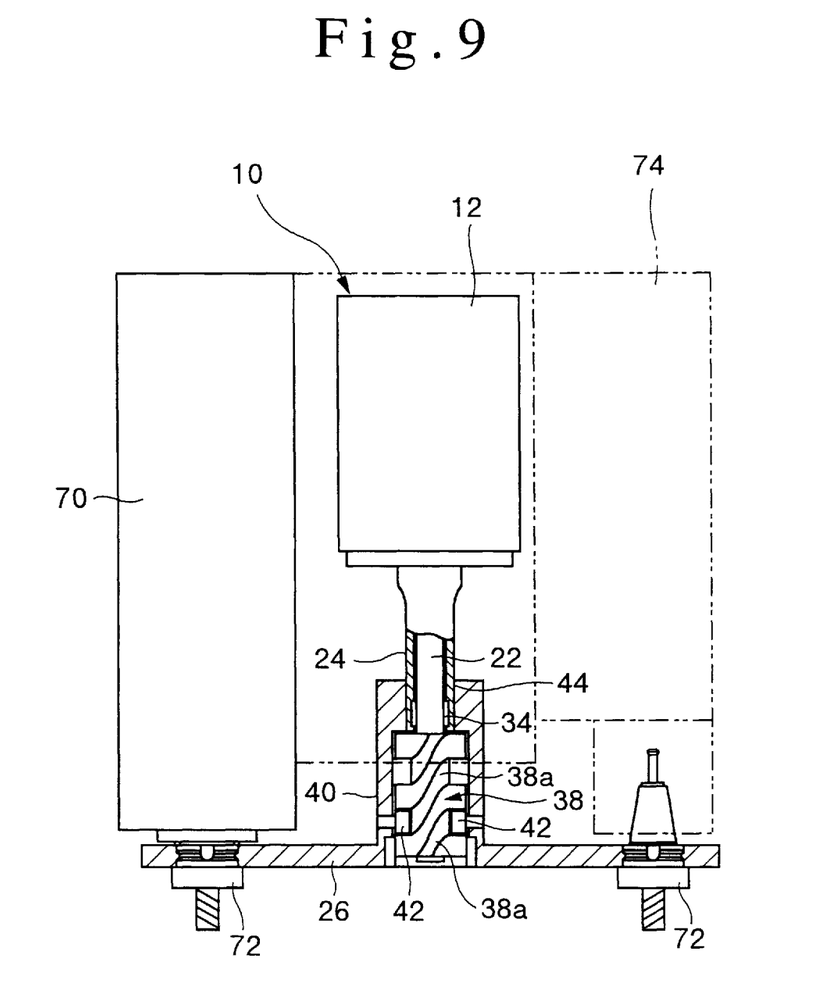
FIG. 9 is a front elevation showing the mounting condition in the first embodiment of the automatic tool changer of the invention.

In the shown embodiment, as shown in FIG. 9, the cam type automatic tool changer 10 is installed on a machine tool 70 in the reversed orientation to that illustrated in FIG. 1 for changing the tools 72 to be employed in the machine tool 70. Namely, the tool holding arm 26 is designed for chucking and releasing the tools 72 at both end portions so that a new tool 72 is held at one end and the tool 72 which becomes unnecessary is held at the other end. Next, the tool holding arm 26 is pivoted over 180°. Subsequently, the tool holding arm 26 is lifted upwardly to set the new tool 72 on the machine tool 70, and to return the tool 72 becoming unnecessary to a tool rack 74. Thereafter, the tool holding arm 26 is lowered by lifting motion. Thus, changing of the tools 72 is performed.

Figure 7:
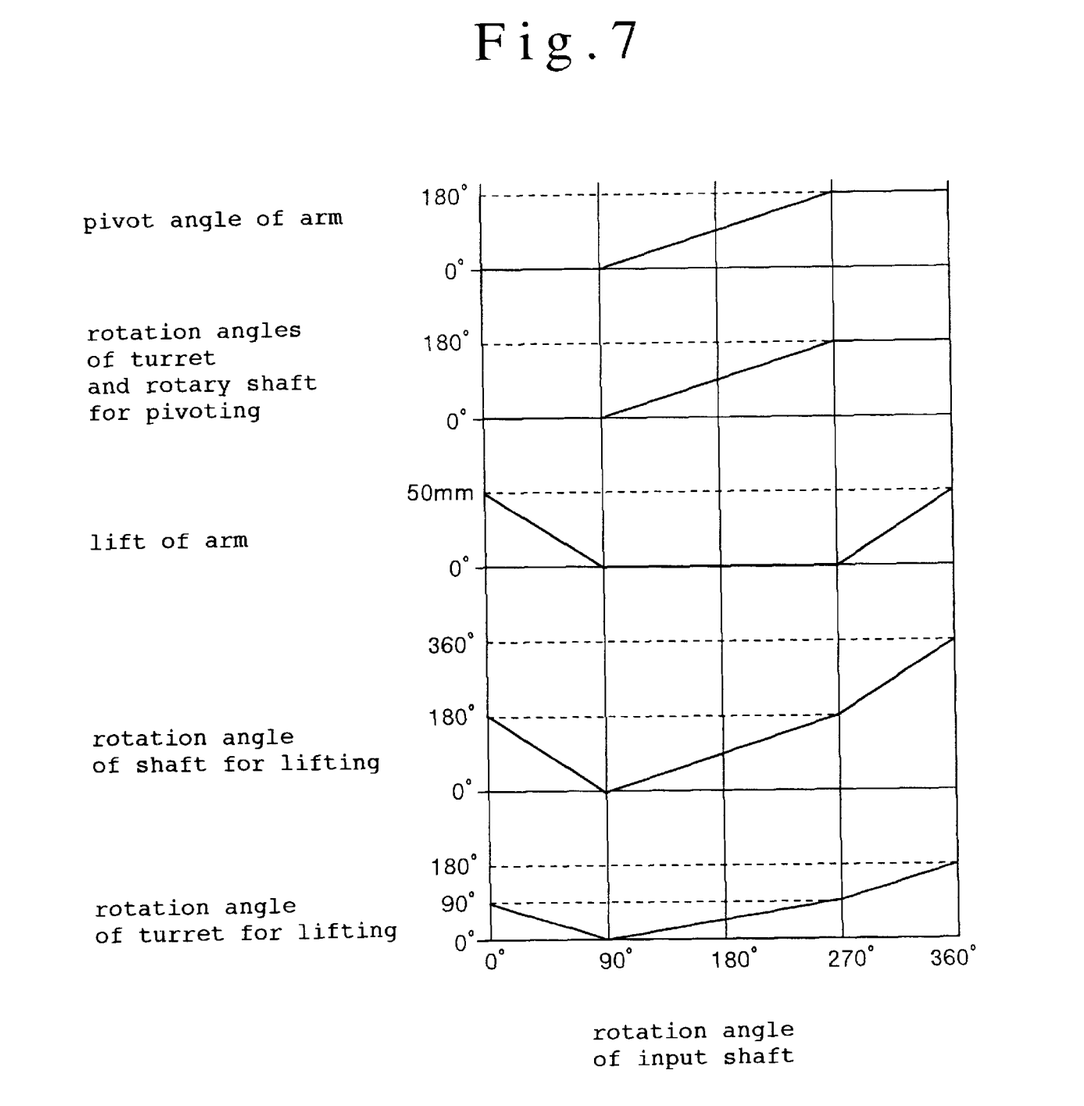
FIG. 7 is a timing chart of pivoting and axial motion of a tool holding arm employed in the first embodiment of the automatic tool changer according to the invention.

The operation of the tool holding arm 26 caused by the lifting turret 56 and the pivoting turret 60 is performed at timings shown in FIG. 7. Pivoting motion of the tool holding arm 26 is performed by rotation of the pivoting rotary shaft 24. At this time, the arm supporting member 40 pivots in a condition where the cam followers 42 provided at inside is in engagement with the cam groove 38a of the motion converting cam 38. Therefore, lifting motion can also be performed associating with pivoting of the tool holding arm 26. In the shown embodiment, the timing of the rotational motion is divided into that for the pivoting motion and the lifting motion of the tool holding arm 26 to synchronously rotate the lifting turret 56, and thus the lifting rotary shaft 22 with the pivoting rotary shaft 24.

Figure 8:
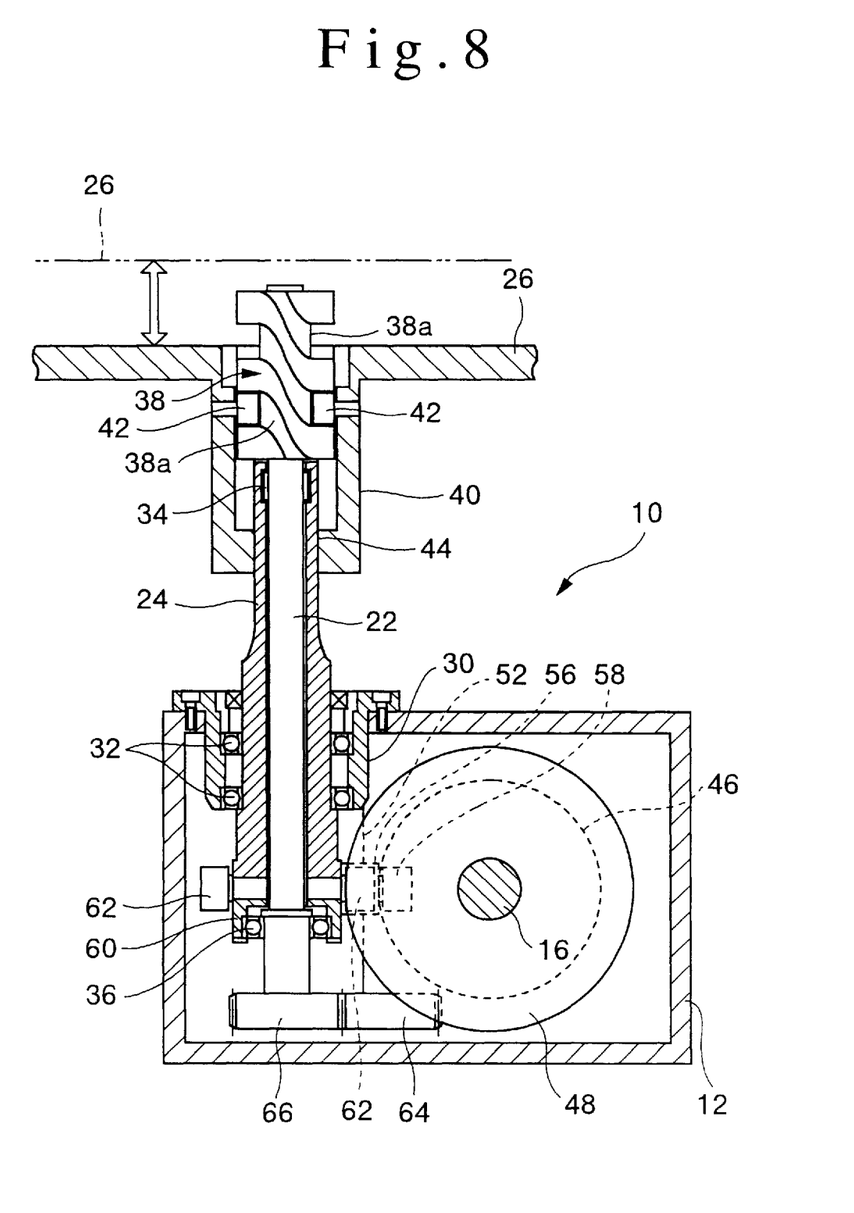
FIG. 8 is a sectional front elevation showing an operating condition in the first embodiment of the automatic tool changer of the invention.

Namely, operation of the cam type automatic tool changer 10 will be discussed with reference to the timing chart. At first, (i) In a range of rotation angle of 0° to 90° of the input shaft 16, rotation of the input shaft 16 is input to the lifting turret 56 via the first converting mechanism 18 at the first timing to return the lifting turret 56 over 90°. This rotation is input to the lifting rotary shaft 22 via the first and second gears 64 and 66 having gear ratio of 2:1 to rotate the motion converting cam 38 over 180°. By this rotation, the tool holding arm 26 is shifted downwardly (motion magnitude being 50 mm) as shown in FIG. 8. At this time, the pivoting turret 60 is not rotated.

(ii) In a range of rotation angle of 90° to 270° of the input shaft 16, rotation of the input shaft 16 is input to the pivoting turret 60 via the second converting mechanism 20 at a second timing as a rotation for advancing the pivoting turret for 180°. By this rotation, the pivoting rotary shaft 24 is rotated over 180° in the advancing direction to cause pivotal motion of the tool holding arm 26 over 180°. At this time, the motion converting cam 38 causes relative rotation relative to the arm supporting member 40 to prevent lifting motion of the tool holding arm 26. Therefore, the lifting turret 56 and thus the lifting rotary shaft 22 is also rotated for advancing over 180° synchronously.

(iii) In a range of rotation angle of 270° to 360° of the input shaft 16, the rotation of the input shaft 16 is input to the lifting turret 56 via the first converting mechanism 18 as rotation for advancing over 90° oppositely to that of the rotational angular range of 0° to 90° of the case (i). This rotation causes rotation of the lifting rotary shaft 22 and the motion converting cam 38 for advancing over 180°, via the first and second gears 64 and 66. By this, conversely to the case of (i), the tool holding arm 26 is shifted upwardly to return to the initial position. At this time, the pivoting turret 60 is not rotated.

In the shown embodiment of the cam type automatic tool changer 10, a combination of the lifting rotary shaft 22 and the pivoting rotary shaft 24 may operate as the output shaft causing lifting motion and pivoting motion in the tool holding arm 26. In the shown embodiment, automatic tool changer 10 includes the motion converting cam 38 provided on the lifting rotary shaft 22 and converting the rotational motion about the axis into a lifting motion and the arm supporting member 40 having the cam followers 42 engaged with the motion converting cam 38 and coupled with the pivoting rotary shaft 24 for permitting relative motion in the axial direction by the spline coupling 44. Both of the lifting rotary shaft 22 and the pivoting rotary shaft 24 forming the output shaft, particularly, the lifting rotary shaft 22 causing lifting motion in the tool holding arm 26 can cause lifting motion only in the tool holding arm 26 without causing any motion in the axial direction. Therefore, necessary space for the lifting rotary shaft 22 and the pivoting rotary shaft 24 as the output shaft can be restricted to the necessary minimum space to rotate these shaft 22 and 24 so as to contribute for down-sizing of the automatic tool changer 10.

On the other hand, since all of the motion system except for the motion converting cam 38 for causing lifting motion of the tool holding arm 26 and the splined portion 44 of the arm supporting member 40 having the cam followers 42 engaging with the motion converting cam 38, are constructed with rotary motion system, and constructional portion for obtaining the lifting motion is formed only by the cam mechanism. Therefore, motion is smooth and load to be created is small. Also, since the elements for causing the lifting motion are only the arm supporting member 40 and the tool holding arm 26, the inertia force to be created can be reduced to realize high speed operation of the automatic tool changer 10.

On the other hand, in the shown embodiment, by the first converting mechanism 18 having the lifting cam 46 and the second converting mechanism 20 having the pivoting cam 48, rotational swing motion at the first timing and intermittent rotation at the second timing to be input to the lifting rotary shaft 22 and the pivoting rotary shaft 24 are created from rotation of the input shaft 16.

By rotations at the first and second timings of the lifting rotary shaft 22 and the pivoting rotary shaft 24 taking out the rotational motion from the single input shaft 16, accuracy of actuation of the tool holding arm 26 obtained by interaction of the motion converting cam 38 and the arm supporting member 40 provided on respective rotary shafts 22 and 24, can be enhanced to realize higher operation.

Figure 10:
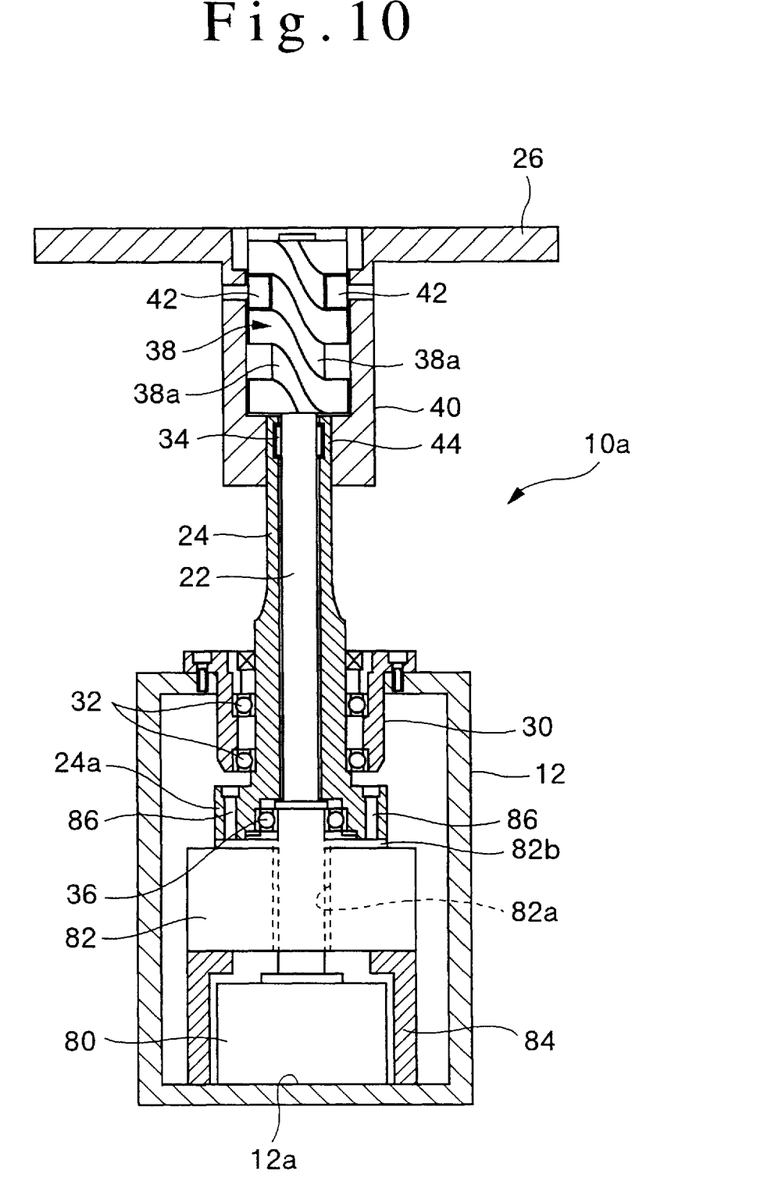
FIG. 10 is a sectional front elevation of the second embodiment of an automatic tool changer according to the present invention.

FIG. 10 is a sectional front elevation of the second embodiment of the automatic tool changer 10a according to the present invention. In the following discussion, like elements to those of the first embodiment will be identified by like reference numerals and redundant discussion will be avoided for simplification of disclosure to facilitate clear understanding of the present invention.

Namely, the shown embodiment of the automatic tool changer 10a creates pivoting rotation at the first timing input to the lifting rotary shaft 22 and intermittent rotation at the second timing input to the pivoting rotary shaft 24 by rotation control of the first servo motor 80 and the second servo motor 82.

The first servomotor 80 is mounted on the bottom portion 12a of the housing 12 immediately below the lifting rotary shaft 22. Also, the second servomotor 82 is mounted coaxially with the first servomotor 80, on the cylindrical base 84 arranged surrounding the outer periphery of the first servomotor 80. In the second servo motor 82, a hollow hole 82a extending through the lifting rotary shaft 22 at the center portion, is formed. The lifting rotary shaft 22 is inserted the lower end portion thereon into the hollow hole 82a to be connected to the first servomotor 80.

On the other hand, the second servomotor 82 is provided with an output portion 82b surrounded by the hollow hole 82a. Then, the flange portion 24a provided on the lower end portion of the pivoting rotary shaft 24 is connected to the output portion 82b via bolts 86.

Then, revolution of the first servo motor 80 is controlled for forward and reverse rotation at the first timing to create rotational swing motion input to the lifting rotary shaft 22. Also, revolution of the second servomotor 82 is controlled for intermittent rotation at the second timing to en create intermittent rotation input to the pivoting rotary shaft 24.

Accordingly, similarly to the first embodiment, in the shown embodiment, the rotational swing motion input to the lifting rotary shaft 22 is converted into the reciprocal linear motion in the axial direction via the motion converting cam 38 to cause lifting motion of the tool holding arm 26. In conjunction therewith, by the intermittent rotation input to the pivoting rotary shaft 24, the tool holding arm 26 is pivoted to permit changing of the tools 72. Then, since the rotational swing motion at the first timing and the intermittent rotation at the second timing can be caused by the first and second servo motors 80 and 82, the structure within the housing 12 can be simplified to permit down-sizing thereof, and thus to contribute for down-sizing of the automatic tool changer 10a.

Figure 11:
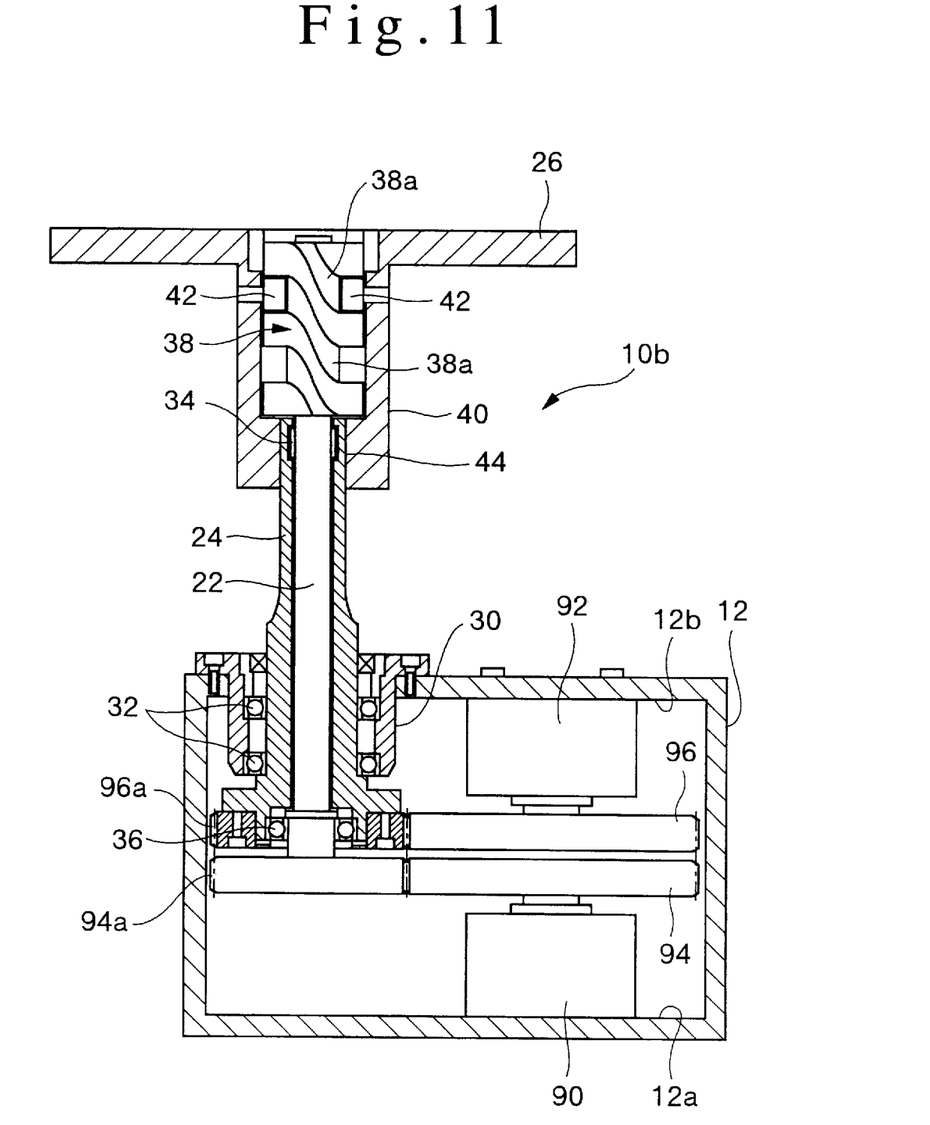
FIG. 11 is a sectional front elevation of the third embodiment of an automatic tool changer according to the present invention.

FIG. 11 is a sectional front elevation of the third embodiment of the automatic tool changer 10b according to the present invention. In the following discussion, like elements to those of the first and second embodiments will be identified by like reference numerals and redundant discussion will be avoided for simplification of disclosure to facilitate clear understanding of the present invention.

Namely, similarly to the second embodiment, the shown embodiment of the automatic tool changer 10b causes the rotational swing motion input to the lifting rotary shaft 22 by a first servo motor 90 and the intermittent rotation input to the pivoting rotary shaft 24 by a second servo motor 92.

The servomotor 90 is mounted on the bottom portion 12a of the housing 12 at a portion distanced from the lifting rotary shaft 22. In conjunction therewith, the second servomotor 92 is mounted on a ceiling portion 12b of the housing 12 in opposition to the first servomotor 90. The output rotation of the first servomotor 90 is transmitted to the lifting rotary shaft 22 via first and second lifting gears 94 and 94a. Also, the output rotation of the second servomotor 92 is output to the pivoting rotary shaft 24 via first and second pivoting gears 96 and 96a.

Then, similarly to the second embodiment, rotation of the first servo motor 90 is controlled to cause rotational swing motion to be input to the lifting rotary shaft 22 at the first timing, and revolution of the second servo motor 92 is controlled to cause intermittent rotation to be input to the pivoting rotary shaft 24 at the second timing.

Accordingly, similarly to the second embodiment, the shown embodiment causes lifting motion of the tool holding arm 26 by rotational swing motion input to the lifting rotary shaft 22 and pivoting motion of the tool holding arm 26 by intermittent rotation input to the pivoting rotary shaft 24 to achieve down-sizing of the automatic tool changer 10b.

In the automatic tool changer according to the present invention as discussed above, a combination of the first rotary shaft and the-second rotary shaft performs a function as an output shaft causing linear motion in the axial direction and pivoting motion in the tool holding arm. The present invention has a motion converting cam provided on the first rotary shaft and converting rotational motion about the axis into the linear motion in the axial direction, and an arm supporting member having the cam follower engaged with the motion converting cam and splined with the second rotary shaft for permitting relative motion in the axial direction, with respect to the second rotary shaft. Thus, only tool holding arm can cause linear motion in the axial direction without causing motion in the axial direction on both of the first rotary shaft and the second rotary shaft forming the output shaft, particularly, the first rotary shaft causing linear motion in the axial direction on the tool holding arm. Therefore, necessary space for the first rotary shaft and the second rotary shaft as the output shaft can be reduced to be a possible minimum space required only for rotating motion. Thus, downsizing of the automatic tool changer can be achieved.

On the other hand, all of the motion system except for the motion converting cam for causing lifting motion of the tool holding arm and the splined portion of the arm supporting member having the cam follower engaging with the motion converting cam, are constructed with rotary motion system, and constructional portion for obtaining the lifting motion is formed only by the cam mechanism. Therefore, motion is smooth and load to be created is small. Also, since the elements for causing the lifting motion are only the arm supporting member and the tool holding arm, the inertia force to be created can be reduced to realize high speed operation of the automatic tool changer.

On the other hand, the rotational motion input to the first rotary shaft at the first timing is creased by the first converting mechanism consisted of the first cam provided on the input shaft and the first turret provided with the cam follower engaged with the first cam. High operation efficiency can be certainly achieved by high transmission efficiency achieved by rotating contact between the cam and the cam follower. Also, operation can be controlled freely by the cam profile, smooth operation can be assured even upon starting and stopping of the automatic tool changer.

Furthermore, rotational motion input to the second rotary shaft at the second timing is created by the second converting mechanism having the second cam provided on the input shaft and the second turret provided with the cam follower engaging with the second cam. High operation efficiency can be certainly achieved by high transmission efficiency achieved by rotating contact between the cam and the cam follower. Also, operation can be controlled freely by the cam profile, smooth operation can be assured even upon starting and stopping of the automatic tool changer.

Also, employing the second converting mechanism together with the first converting mechanism, the first rotary shaft and the second rotary shaft are driven to rotate by taking out the rotational motion from the same input shaft at the first and second timings. Therefore, accuracy of actuation of the tool holding arm obtained by interaction between the motion converting cam and the arm supporting member provided on respective rotary shafts, can be enhanced to realize high speed operation.

On the other hand, the rotational motion at the first timing and the rotational motion at the second timing can be caused by controlling revolution of the first servomotor and the second servomotor respectively connected to the first rotary shaft and the second rotary shaft. Therefore, the construction of the automatic tool changer can be simplified and made compact to contribute for downsizing of the automatic tool changer.

Although the present invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

It should be noted that the cams employed in the shown embodiments of the automatic tool changers set forth above may be driven by hydraulically operated actuators which is cooperated with a hydraulic circuit. The hydraulic circuit may incorporate a fluid pressure compensation device. As the fluid pressure compensation device, the device which has been disclosed in a commonly owned co-pending application for the invention entitled "Pressure Loss Compensation Device of Fluid Pressure Circuit" which has been filed with claiming priority on the basis of Japanese Patent Application No. Heisel 8-298954. The disclosure of the above-identified co-pending patent application will be herein incorporated by reference.

What is claimed is:

1. An automatic tool changer comprising:
    a first rotary shaft, to which rotational motion is input at a first timing;
    a second rotary shaft provided coaxially with said first rotary shaft and permitting mutual relative rotation, and, to which rotational motion is input at a second timing;
    a motion converting cam provided on said first rotary shaft and converting a rotational motion about an axis of said first rotary shaft into a linear motion in an axial direction;
    an arm supporting member having a cam follower engaged with said motion converting cam and being splined with said second rotary shaft for relative motion in a direction of axis of said second rotary shaft; and
    a tool holding arm provided on said arm supporting member and detachably supporting a tool.

2. An automatic tool changer as set forth in claim 1, wherein said first rotary shaft is arranged at the center and said second rotary shaft in cylindrical form being coaxially arranged outside of said first rotary shaft for permitting relative rotation.

3. An automatic tool changer as set forth in claim 1, wherein said motion converting cam is constructed with a cam groove formed into a spiral shape on the periphery of said first rotary shaft.

4. An automatic tool changer as set forth in claim 3, wherein said cam groove of said motion converting cam formed in spiral shape is set in a meandering pattern to set shifting speed of said cam follower low at initial stage of shifting, high at subsequent motion range and low upon stopping.

5. An automatic tool changer as set forth in claim 3, wherein said cam groove of said motion converting cam formed in spiral shape is set in a linear pattern to set shifting speed of said cam follower constant.

6. An automatic tool changer as set forth in claim 1, wherein said first rotational motion to be input to said first rotary shaft at said first timing is a forward and reverse rotational swing motion, and said second rotational motion to be input to said second rotary shaft at said second timing is an intermittent rotation.

7. An automatic tool changer as set forth in claim 1, wherein said first rotational motion to be input to said first rotary shaft at said first timing is a forward and reverse rotational swing motion, and said second rotational motion to be input to said second rotary shaft at said second timing is an intermittent rotation, linear motion and rotational motion relative to said arm supporting member provided on said second rotary shaft are created independently of each other by setting the rotational motion at said first timing and the rotational motion at said second timing, upon stopping of said second rotary shaft, said first rotary shaft is caused rotational swing motion in forward and reverse directions, and, upon intermittent rotation in one direction of said second rotary shaft, said first rotary shaft is rotated synchronously in the same direction.

8. An automatic tool changer as set forth in claim 1, wherein the rotational motion input to said first rotary shaft at said first timing is created by a first converting mechanism having a first cam provided on said input shaft and a first turret provided with a cam follower engaged with said first cam.

9. An automatic tool changer as set forth in claim 8, wherein the rotational motion input to said second rotary shaft at said second timing is created by a second converting mechanism having a second cam provided on said input shaft and a second turret provided with a cam follower engaged with said second cam.

10. An automatic tool changer as set forth in claim 9, wherein said first cam and said second cam are globoidal cams provided for integral rotation with the same input shaft.

11. An automatic tool changer as set forth in claim 9, wherein at least one of a set of said first turret of said first converting mechanism and said first rotary shaft and a set of said second turret of said second converting mechanism and said second rotary shaft is mutually connected via a speed increasing gear mechanism transmitting the rotation speed of one of said first turret and said second turret to one of said first rotary shaft and said second rotary shaft with acceleration.

12. An automatic tool changer as set forth in claim 1, wherein said rotational motion of said first timing is created by controlling revolution of a first servo motor connected to said first rotary shaft.

13. An automatic tool changer as set forth in claim 1, wherein said rotational motion of said second timing is created by controlling revolution of a second servo motor connected to said second rotary shaft.

14. An automatic tool changer as set forth in claim 13, wherein said first servo motor and said second servo motor are arranged coaxially in vertically stacked fashion, one of said first servo motor and said second servo motor positioned at upper position is formed into a cylindrical shape having a hollow portion formed at the central portion, through which said second rotary shaft or said first rotary shaft is inserted, and an output portion surrounding said hollow portion, said output portion being connected to said first rotary shaft or said second rotary shaft, and the other of said first servo motor and said second servo motor arranged at the lower position is connected to said second rotary shaft or said first rotary shaft downwardly extended through said hollow portion.

15. An automatic tool changer as set forth in claim 13, wherein at least one of said first servo motor and said second servo motor is arranged at a position distanced from said first rotary shaft or said second rotary shaft, and at least one of said first servo motor and said second servo motor is connected to any one of said first rotary shaft and said second rotary shaft via at least one of gear mechanisms.

16. An automatic tool changer comprising:
a first converting mechanism creating rotational motion at a first timing and including a first globoidal cam provided on an input shaft and a first turret provided with a cam follower engaged with said first globoidal cam;
a second converting mechanism creating rotational motion at a second timing including a second globoidal cam provided on said input shaft for integral rotation with said first globoidal cam, and a second turret having a cam follower engaged with said second globoidal cam;
a first rotary shaft connected to said first converting mechanism and being input rotational motion at said first timing from said first converting mechanism;
a second rotary shaft formed into a cylindrical shape, arranged outside of said first rotary shaft in coaxial fashion for permitting relative angular displacement, connected to said second converting mechanism and being input rotational motion at said second timing from said second converting mechanism;
a motion converting cam provided on said first rotary shaft and having a spiral cam groove converting said rotational motion about said first rotary shaft into a linear motion in the axial direction;
an arm supporting member having a cam follower engaged with said motion converting cam and being splined with said second rotary shaft for relative axial motion; and
a tool holding arm provided on said arm supporting member and detachably supporting a tool,
a rotational motion to be input to said first rotary shaft at said first timing being a rotational swing motion in forward and reverse direction, a rotational motion to be input to said second rotary shaft at said second timing being an intermittent rotation, said rotational motion at said first timing and said rotational motion at said second timing being set in order to cause linear motion and rotational motion independently for said arm supporting member provided on said second rotary shaft in such a manner that said first rotary shaft is driven for rotational swing motion in forward and reverse direction upon stopping of said second rotary shaft, and upon intermittent rotation of said second rotary shaft, said first rotary shaft is rotated synchronously in the same direction.

17. An automatic tool changer comprising:
a first servomotor controlled revolution for creating a rotational motion at a first timing;
a second servomotor controlled revolution for creating a rotational motion at a second timing;
a first rotary shaft connected to said first servo motor and being input said rotational motion at said first timing;
a second rotary shaft formed into a cylindrical shape, arranged outside of said first rotary shaft for permitting relative rotation therebetween, and connected to said second servo motor to be input said rotational motion at said second timing;

a motion converting cam provided on said first rotary shaft and formed with a spiral cam groove for converting a rotational motion about said first rotary shaft into a linear motion in an axial direction thereof;

an arm supporting member having a cam follower engaged with said motion converting cam and splined with said second rotary shaft for relative displacement in the axial direction; and a tool holding arm provided on said arm support member and detachably supporting a tool, a rotational motion to be input to said first rotary shaft at said first timing being a rotational swing motion in forward and reverse direction, a rotational motion to be input to said second rotary shaft at said second timing being an intermittent rotation, said rotational motion at said first timing and said rotational motion at said second timing being set in order to cause linear motion and rotational motion independently for said arm supporting member provided on said second rotary shaft in such a manner that said first rotary shaft is driven for rotational swing motion in forward and reverse direction upon stopping of said second rotary shaft, and upon intermittent rotation of said second rotary shaft, said first rotary shaft is rotated synchronously in the same direction.

* * * * *